March 8, 1960 R. A. DAVIS 2,927,754
OUTRIGGER MOUNT
Filed Dec. 7, 1956 2 Sheets-Sheet 1
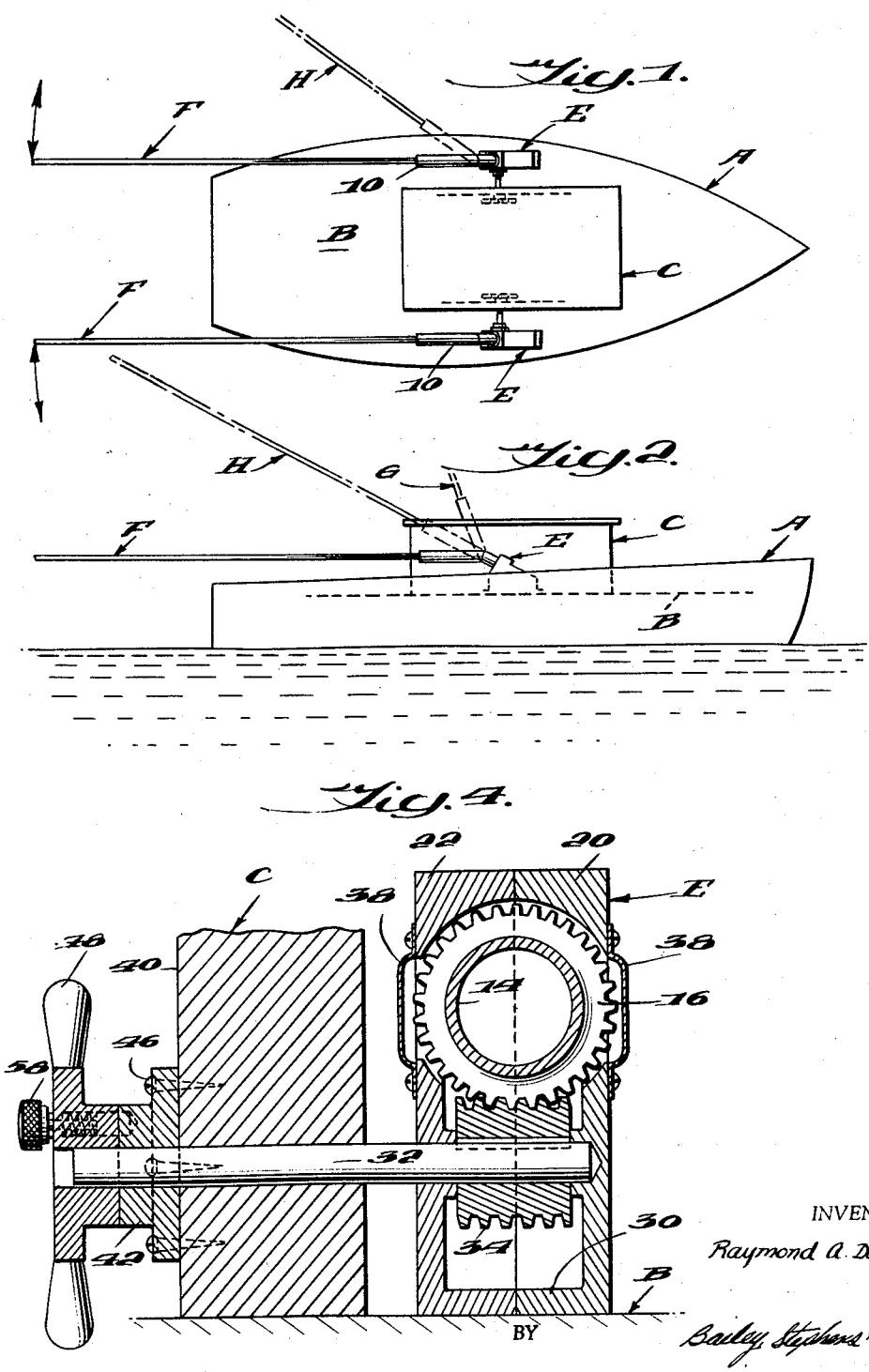
INVENTOR
Raymond A. Davis
BY
Bailey, Stephens & Huettig
ATTORNEYS March 8, 1960 R. A. DAVIS 2,927,754
OUTRIGGER MOUNT
Filed Dec. 7, 1956 2 Sheets-Sheet 2
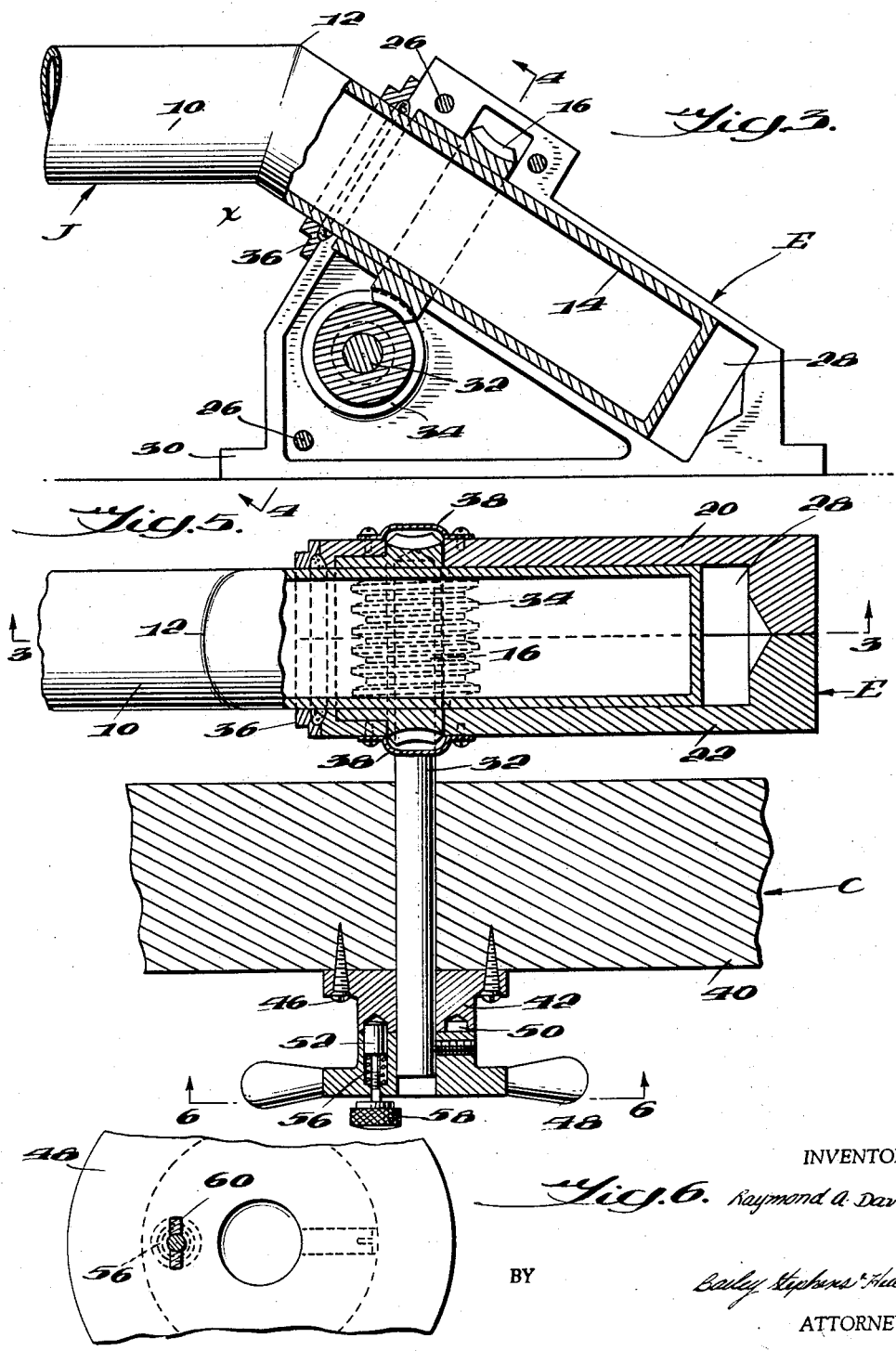
INVENTOR
Raymond A. Davis
BY
ATTORNEYS United States Patent Office 2,927,754
Patented Mar. 8, 1960

2,927,754

OUTRIGGER MOUNT

Raymond A. Davis, Morehead City, N.C.

Application December 7, 1956, Serial No. 626,915

3 Claims. (Cl. 248—40)

This invention relates to an outrigger mount. In particular, the invention is directed to a mount for holding an outrigger trolling pole.

The trolling poles used in outriggers are often at least thirty-five feet in length. They are very difficult to handle when it is necessary to alter their position, as, for example, when the fishing boat encounters rough weather or when the boat must pass under any low bridges. Prior attempts to simplify the handling of the pole have been made such as shown in the patent to Wells No. 2,727,707.

An object of this invention is to provide a means for moving a fishing outrigger pole from a retracted to an extended position, and vice versa, by the simple turning of a mounting means.

In general, these objects are accomplished by the use of a bent or elbow tube for holding the base of a trolling pole. This tube is held by a mounting secured to the deck of the boat and actuated by a gear mechanism preferably from the interior of the cabin of the vessel. The mounting and tube are such that the pole holding portion of the tube can be turned from a retracted position substantially parallel with the deck of the boat to a substantially vertical position, slightly inclined aft. Thus, the pole is moved substantially through a quadrant which is upwardly and outwardly inclined with respect to the deck of the boat.

The means by which the objects of the invention are obtained are described more fully with reference to the accompanying drawings, in which:

Figure 1 is a plan view of a boat with the mounting thereon;

Figure 2 is a side elevational view of Figure 1;

Figure 3 is a side elevational view, partly in section, of the trolling pole mounting;

Figure 4 is a cross-sectional view on the line 4—4 of Figure 3;

Figure 5 is a plan view, partly in section, of Figure 3; and

Figure 6 is a cross-sectional view on the line 6—6 of Figure 5.

As seen in Figures 1 and 2, the boat A has a deck B and a cabin C. Fastened to the deck on each side of the cabin are the mountings E for the trolling poles F. The starboard and port mountings E are similar, except that their operating shafts extend oppositely, so as to enter cabin C.

As shown by the dotted line position of pole F, the pole is to be swung from a position substantially parallel to the deck B in an outwardly and upwardly inclined arc until the pole extends outwardly substantially abaft the boat and the position indicated by the dotted line G of Figure 2. For purposes of trolling, the pole can take any intermediate position H, all depending upon how far out it is desired to have the fishing lines extend from the sides of the boat.

The trolling pole holder is composed of a bent or elbow tube J composed of a socket or pole holding portion 10 connected by elbow 12 to a base portion 14. The angle X of the elbow is approximately 145½°. A pinion 16 or worm gear is fastened to base portion 14.

The triangular housing E for base portion 14 is composed of two half segments 20 and 22 secured together by any suitable means such as by bolts 26. This housing has a flat bottom side secured to the deck of the boat and has an inclined cylindrical bore 28 for receiving base portion 14. Bore 28 is inclined with respect to the horizontal or its base 30 at an angle of about 32½°. A shaft 32 is journalled in the housing and has a worm 34 splined thereto and engaging pinion 16. The housing is provided with a water seal collar 36 and covered ports 38.

Shaft 32 is adapted to extend through wall 40 of cabin C, the outer end of the shaft being carried in a bushing 42 fastened to the cabin wall by means of screws 46. The outer end of shaft 32 has a handwheel 48 connected thereto.

In order to hold the handwheel in any rotational position, bushing 42 has a plurality of radially located holes 50, while the hub of wheel 48 has fitted thereto a lock plunger 52 inwardly pressed by a spring 56 and openable by a knob 58. Knob 58 has on its underside a crossbar 60 which is seatable in a corresponding recess in the hub of wheel 48. Consequently, when knob 58 is pulled out and turned, the crossbar 60 holds plunger 52 in withdrawn unlocked position.

In operation, assuming that the trolling poles F lie in the full line retracted position as shown in Figures 1 and 2 the poles extend substantially parallel to deck B. To elevate the poles, knob 58 is turned to unlocked position and then by the turning of wheel 48 the worm gear rotates base portion 14 and turns pole holding portion 10 so that portion 10 swings outwardly of the boat and moves pole F along the line of an upwardly and outwardly inclined arc. When the pole reaches the desired position for trolling, the wheel is turned to the nearest locking hole and can be locked by turning knob 58 to fit the crossbar 60 in its corresponding slot. In the event that the pole is to be retracted, because of rough weather or because of a low bridge, the reverse operation can be performed from inside the cabin without the necessity of the operator moving outside to manipulate the heavy unwieldy rods.

Having now described the means by which the objects of the invention are obtained, I claim:

1. An outrigger support for a fishing outrigger comprising an elbow tube having an outer pole holding portion and a base portion, a triangular housing having a flat bottom side adapted to be secured to the deck of a boat and containing an inclined cylindrical bore, said base portion being mounted in said bore for unrestricted rotation only in said cylindrical bore, and a gearing mounted in said housing and connected to said tube for rotation of said base portion to turn said pole holding portion from a substantially horizontal position to a substantially vertical position.

2. An outrigger support as in claim 1, said pole holding portion and said base portion being joined at an angle of about 145½°, and said base portion being mounted in said cylindrical bore at an angle of about 32½° from the horizontal.

3. An outrigger support as in claim 2, said gearing including a shaft, a handwheel mounted on said shaft, and means attached to said handwheel for selectively locking said handwheel against rotation.

References Cited in the file of this patent

UNITED STATES PATENTS

| | | |
|---|---|---|
| 2,233,222 | Paton | Feb. 25, 1941 |
| 2,583,210 | Edwards | Jan. 22, 1952 |
| 2,646,240 | Anderson | July 21, 1953 |